Figure 1:
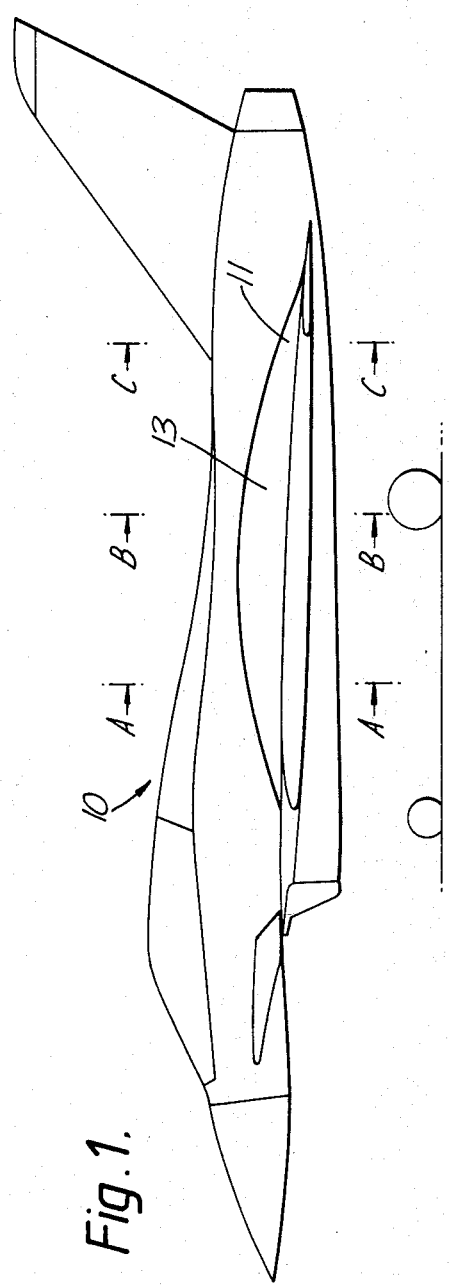

United States Patent [19]

Garside et al.

[11] Patent Number: 4,776,537

[45] Date of Patent: Oct. 11, 1988

[54] FUEL STORAGE MEANS

[75] Inventors: Christopher M. Garside; Arthur N. Rhodes, both of Preston, United Kingdom

[73] Assignee: British Aerospace PLC, London, England

[21] Appl. No.: 894,913

[22] Filed: Aug. 8, 1986

[30] Foreign Application Priority Data

Aug. 8, 1985 [GB] United Kingdom ................. 8519931

[51] Int. Cl.$^4$ ............................................ B64D 37/04
[52] U.S. Cl. .................................. 244/135 R; 244/219; 244/130
[58] Field of Search ............... 244/135 R, 135 B, 105, 244/107, 219, 130; 220/85 B, 1 B, 18; 114/331

[56] References Cited

U.S. PATENT DOCUMENTS

| | | | |
|---|---|---|---|
| 2,777,656 | 1/1957 | Clifton | 244/135 B |
| 3,101,921 | 8/1963 | Price | 244/135 B |
| 3,380,691 | 4/1968 | McCames | 244/135 R |
| 3,447,768 | 6/1969 | McQueen | 244/219 |
| 4,026,503 | 5/1977 | Rhodes | 244/135 B |
| 4,214,721 | 7/1980 | Burhans et al. | 244/135 B |

Primary Examiner—Galen Barefoot
Attorney, Agent, or Firm—Cushman, Darby & Cushman

[57] ABSTRACT

This invention relates to a collapsible fuel storage tank for storing fuel on an aircraft. According to this invention, there is provided an aircraft including a fuselage portion, a wing portion connected thereto and an expandable fuel storage tank disposed adjacent the intersection of the wing portion and the fuselage portion. The fuel storage tank has an external surface which includes spanwise spaced inner and outer edge regions extending in a generally chordwise direction. The inner edge region of the tank extending alongside the fuselage portion and the outer edge region being attached to the wing portion to allow movement of the external surface between an empty position in which it lies generally flush with the surrounding surface of the wing portion and a fuel storing position in which it lies at an acute angle to said surrounding surface forming a fillet region between the wing portion and the fuselage portion. By this arrangement when the external surface is in a fuel storing position the wetted area of the aircraft is decreased, rather than increased. In addition, the external surface moves to its fuel storing position without creating large gaps or slots.

10 Claims, 6 Drawing Sheets

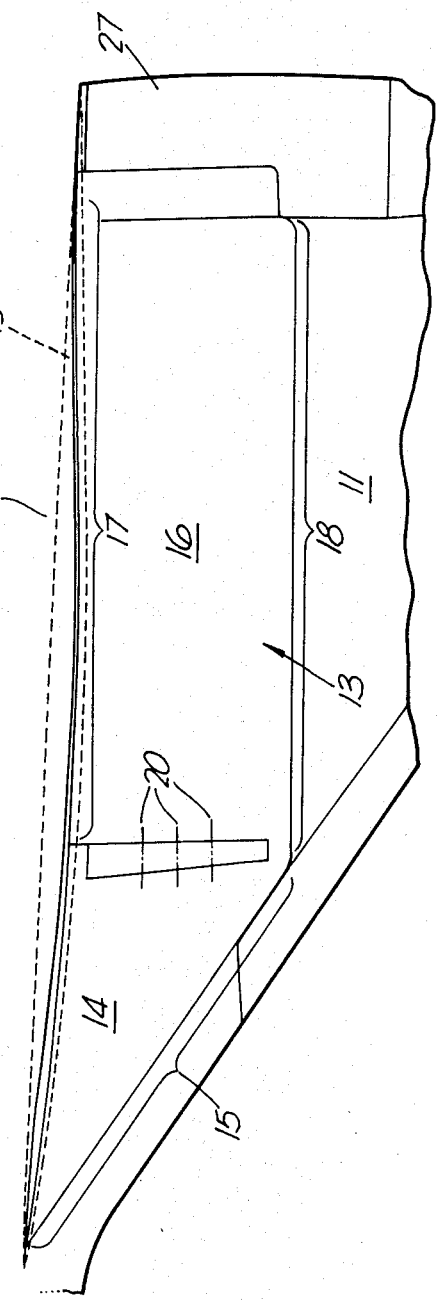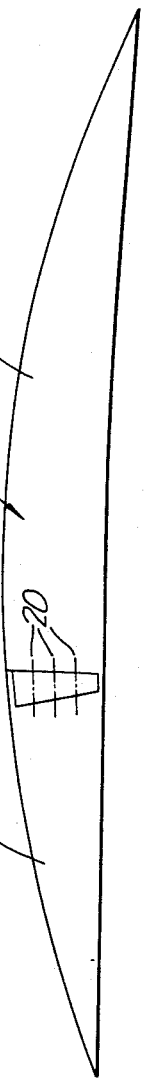

Fig. 7.
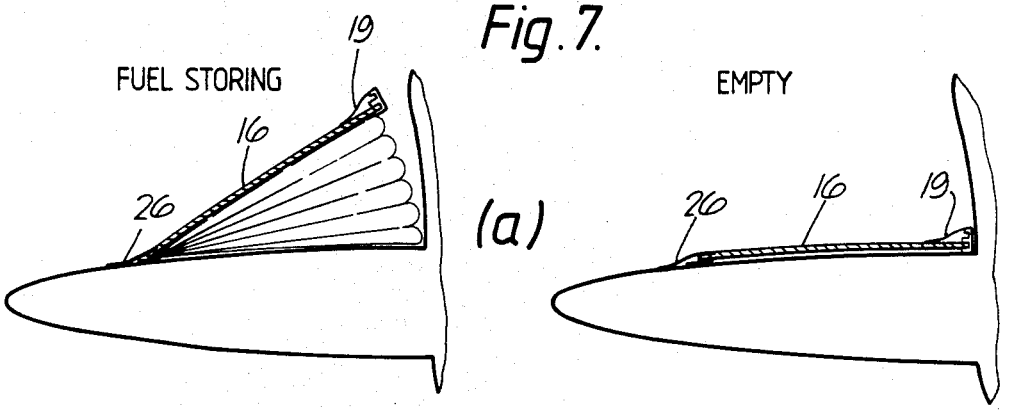
(a) FUEL STORING / EMPTY
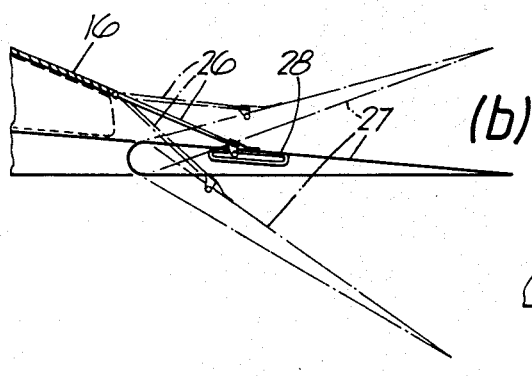
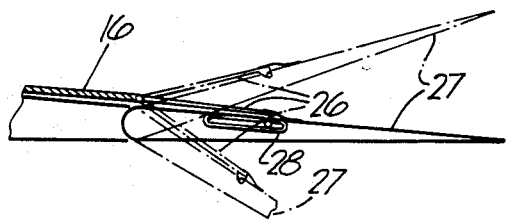
(b)
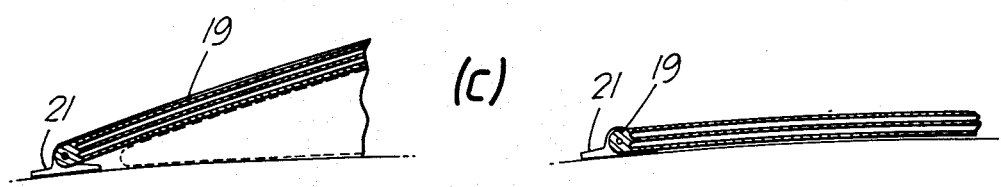
(c)
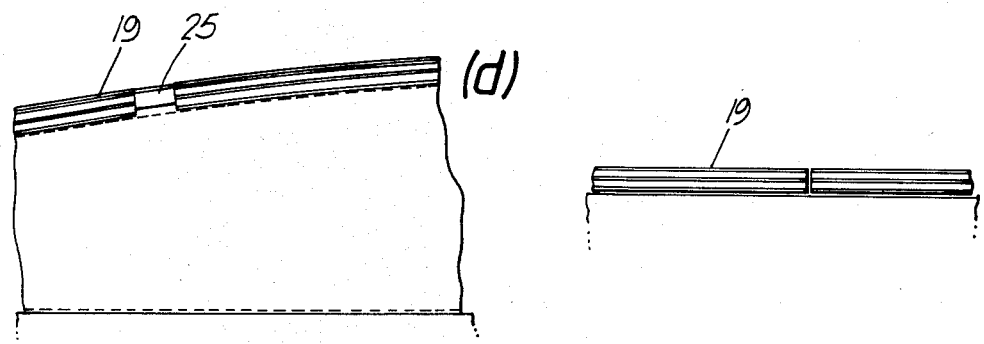
(d)

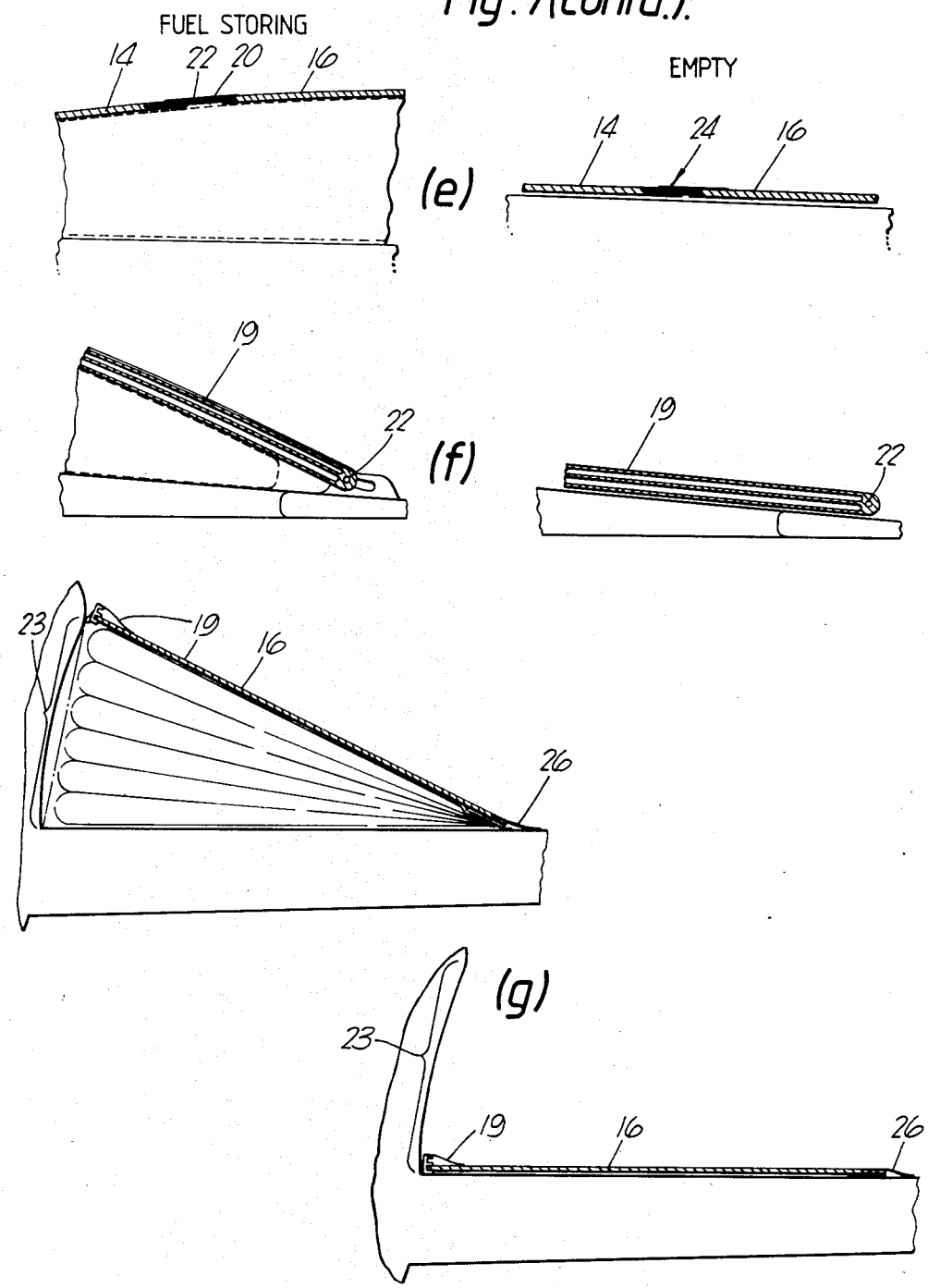
Fig. 7(contd.).

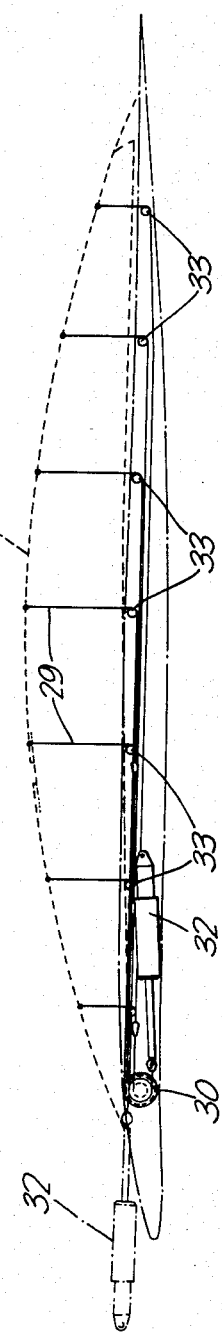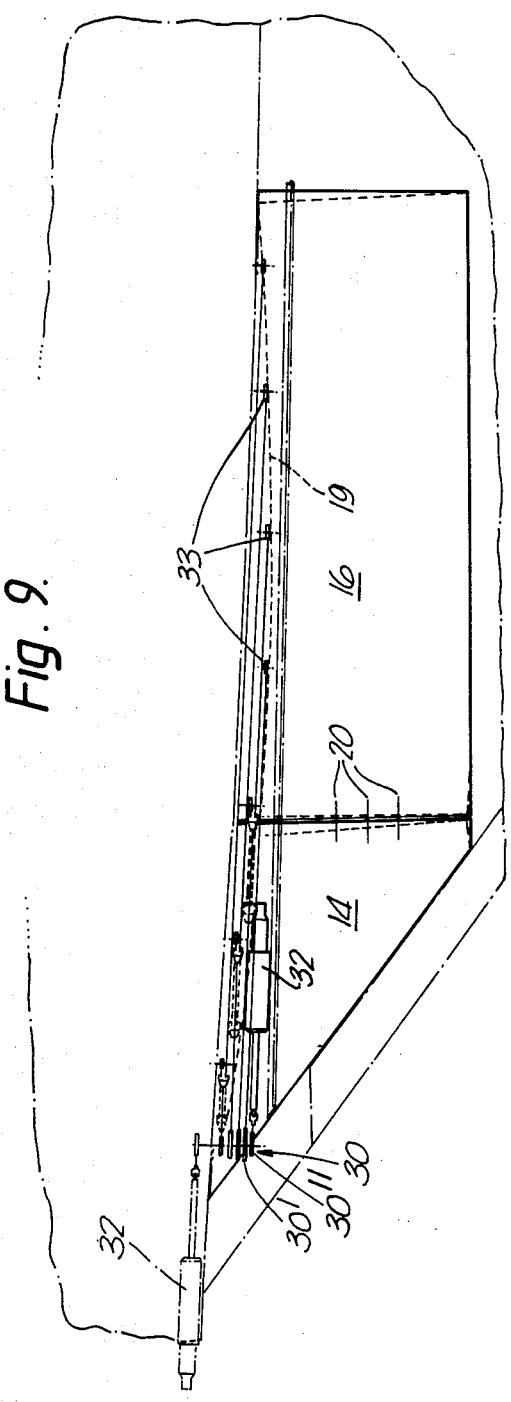

FUEL STORAGE MEANS

This invention relates to collapsible fuel storage means for storing fuel on an aircraft.

It is known from U.K. Pat. No. 1,503,510 to provide aircraft with an expandable fuel storage tank which comprises a resilient exterior wall panel anchored at both ends to a surface region of the aircraft, one end being in the form of a simple hinge and the other end incorporating a translatory device. When fuel is admitted to the storage tank it is caused to bow out and stand proud of the surface.

A disadvantage of this arrangement is that when the tank is expanded, the wetted area of the aircraft is increased thus increasing the drag attributable to the fuel tank. Moreover the tank when expanded does not blend smoothly with the aircraft structure, thus giving rise to slots which are detrimental to the airflow over the wing. In addition, suction loads on the wall panel are reacted by the volume of fuel within the tank and this may disturb the proper delivery of fuel from the tank.

According to one aspect of this invention, there is provided an aircraft including a fuselage portion, a wing portion connected thereto and expandable fuel storage means disposed adjacent the intersection of said wing portion and said fuselage portion, said fuel storage means having external surface-defining means which includes spanwise spaced inner and outer edge regions extending in a generally chordwise direction, said inner edge region extending alongside the fuselage portion and said outer edge region being attached to said wing portion to allow movement of the surface-defining means between an empty position in which it lies generally flush with the surrounding surface of the wing portion and a fuel storing position in which it lies at an acute angle to said surrounding surface forming a fillet region between the wing portion and the fuselage portion.

By this arrangement when the external surface-defining means is in a fuel storing position the wetted area of the aircraft is decreased, rather than increased. In addition, the external surface-defining means moves to its fuel storing position without creating large gaps or slots.

The external surface-defining means is preferably of trapezoidal planform having an inner edge region lying generally alongside the body portion, an outer edge region extending generally chordwise, a forward edge region extending along a leading edge region of the wing portion and a rearward edge region extending along a trailing edge region of the wing portion.

In this instance, the trapezoidal external surface-defining means preferably comprises a forward resiliently deformable panel element of generally triangular planform and a rearward resiliently deformable panel element of generally rectangular planform, the forward panel element having an inner edge region extending generally alongside the fuselage portion, an outer edge region attached to said leading edge region for hingeing movement, and a rearward edge region slidably coupled to a forward edge region of the rearward panel element. In this arrangement there is preferably provided a resiliently flexible beam element of variable effective length attached to and extending along the inner edge regions of said forward and rearward panel elements and being anchored to the wing portion at forward and rearward anchorage points.

Advantageously the surface of said fuselage portion over which the inner edge region of the external surface-defining means passes when moving between the empty and the fuel storing position is of concave form to prevent a gap.

Preferably the fuel storage means includes retraction means operable to draw the external surface-defining means from a fuel storing position towards its empty position. The retraction means preferably comprises a plurality of tie members attached to the external surface-defining means at spaced locations along its inner edge region. Each of said tie members is preferably caused to retract at a predetermined rate relative to the remainder of said tie members thereby to ensure that said inner edge region adopts a predetermined profile when moving between the fuel storage and the empty position. The required relative movement of the various tie members may advantageously be achieved by employing a windlass device comprising winding portions for each tie member of predetermined diameter selected having regard to the desired relative rate of retraction. The windlass device may be driven by means of a flexible drive element wrapped around a driving portion of the windlass and having a free end attached to a hydraulic ram for effecting longitudinal movement.

Figure 2:
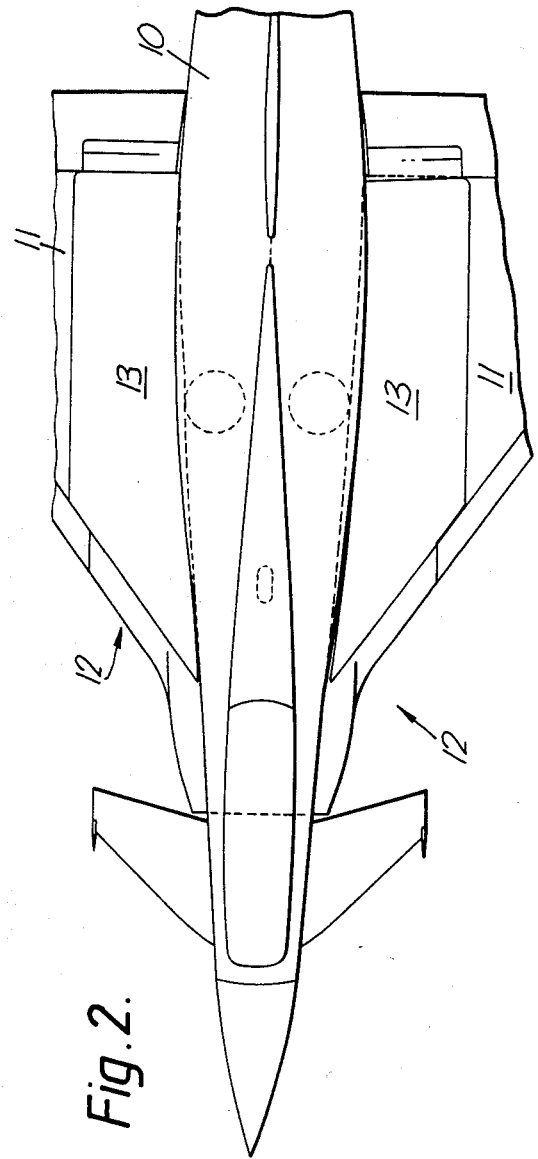
Figure 3:
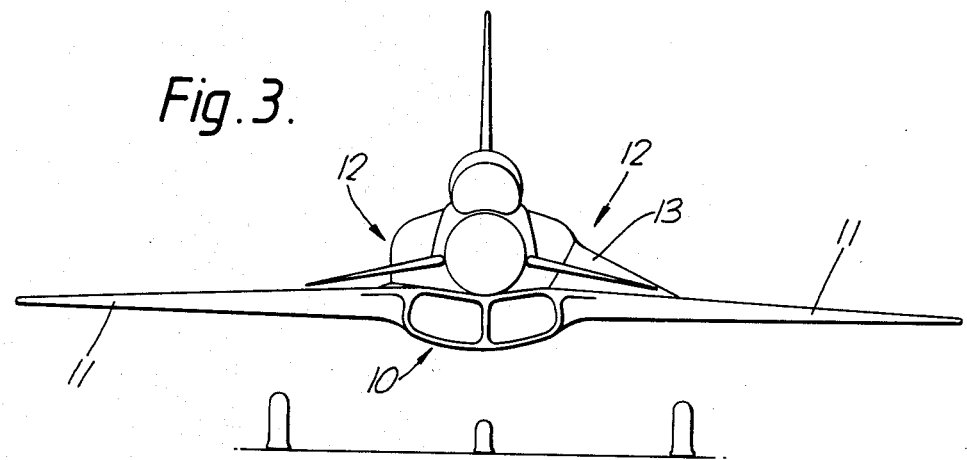

Further aspects will become apparent from the following description which is by way of example only and in which reference will be made to the accompanying drawings, in which:

FIG. 1 is a schematic side view of an aircraft having a collapsible fuel storage system with the port tank in a fuel storing condition, FIG. 2 is a schematic top plan view of the aircraft of FIG. 1, FIG. 3 is a schematic front view of the aircraft of FIG. 1, FIGS. 4(a), 4(b), and 4(c) are section views on part of the aircraft of FIG. 1 taken on lines a—a, b—b, and c—c of FIG. 1 respectively, FIG. 5 is a detailed top plan view on part of the port wing of the aircraft of FIG. 1, FIG. 6 is a side view of the fuel storage tank in a fuel storing condition, FIGS. 7(a) to 7(g) are section views taken on lines a—a, b—b, c—c, d—d, e—e, f—f, and g—g respectively of FIG. 5, shown with the fuel tank in a fuel storing condition and an empty condition, FIG. 8 is a schematic side section view through the fuel storage tank illustrating the retraction mechanism, and FIG. 9 is a schematic top plan view of the fuel storage tank illustrating the retraction mechanism.

Figure 4:
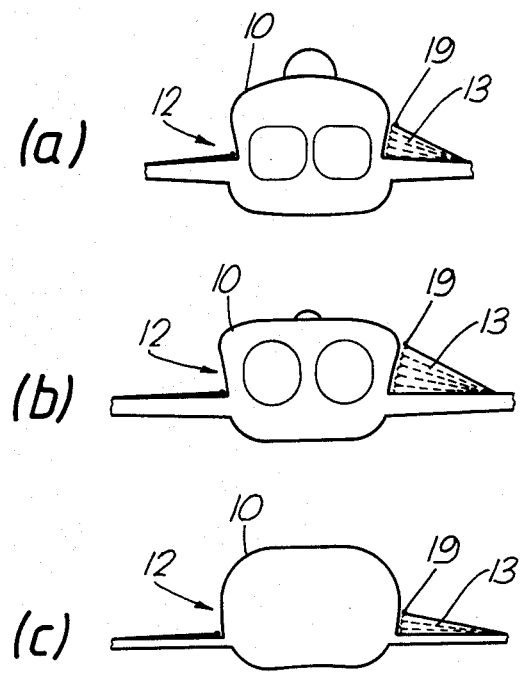

Referring initially to FIGS. 1 to 4, there is illustrated a jet-propelled fighter aircraft incorporating a collapsible fuel storage system. The aircraft includes a main fuselage 10 with port and starboard wings 11 each merging with the fuselage at an intermediate wing root portion 12. The fuel storage system comprises port and starboard collapsible fuel tanks generally designated 13 and each located on the upper surface of the associated wing root portion. In FIGS. 2 to 4 the system is illustrated with the port fuel tank shown in a fully expanded condition and the starboard fuel tank in an empty condition. It will be noted that in the fully expanded condition, the collapsible fuel tank effectively forms a non-structural fillet extending between the wing portion and the associated edge region of the fuselage 10 and therefore that the incremental wetted area of the tank in its fully expanded condition is negative compared to when it is in its fully collapsed condition.

Referring now to FIGS. 5 to 9, the construction of the fuel storage tanks 13 will be described in more detail by particular reference to the port fuel tank. The tank comprises a forward panel 14 of generally triangular planform hingedly attached to the upper surface of the leading edge region of the wing by means of a piano hinge arrangment for hinged movement about a leading edge region 15 and, lying immediately rearwardly of the forward panel 14, a rearward panel 16 of generally rectangular planform having spaced parallel inner and outer side regions 17 and 18 and being hingedly attached to the generally curved upper surface of the wing by means of a piano hinge arrangement for hingeing movement about the outer edge region 18. Each panel is formed of a resiliently flexible material and in the illustrated embodiment comprises a honeycomb core sheathed with carbon fibre reinforced plastics material. The external profile of the tank as it is caused to move from an empty to a fuel storing condition is maintained relatively smoothly curved by means of a resiliently flexible profile control beam 19 having a sliding joint 25 intermediate its ends which is disposed generally in line with the abutting edges of the forward panel and the rearward panel. The profile of the intermediate region between the forward and rearward panels is maintained during movement to a fuel storing condition by means of three spigot pins 20 secured to the rearward edge of the forward panel 14 and sliding in guides (not shown) provided in the core of the rearward panel 16.

The forward end of the control beam 19 is pivotably attached to a forward part of the wing by a bracket 21 allowing rotation only (see FIG. 7(c)) whilst the rearward end of the control beam is connected to the fuselage side by a spherical roller track arrangement 22 which allows both longitudinal and rotational movement of the end of the control beam 19.

As mentioned above, the rearward panel is hingedly attached by means of a piano hinge to a curved surface, and in order to minimise the forces in the plane of the panel which will be increasingly induced as it hinges upwards away from the wing surface, a sliding joint (not shown) is provided at the connection between the piano hinge and the panel. Two fixed locations for the sliding joint between the panel and the piano hinge are provided, at the rearward end of the hinge and towards the forward end. These two points are specially selected to minimise the extent of the movement and also to ensure that there is no relative spanwise movement between the forward and the rearward panel on movement to the fuel storing condition.

The joint between the two panels does nevertheless have to allow for chordwise relative displacement and fairing plates 24 are attached to the forward panel upper and lower surfaces and slide on the aft panel providing an aerodynamic fairing and seal for the joint. Flexible fairing plates 26 are also provided between the leading edge of the forward panel and the adjacent upper surface of the wing, between the outboard edge region of the rearward panel and the associated upper surface of the wing, and between the rearward edge edge portion of the rearward panel and the adjacent upper surface of the wing flap 27, in each case to provide aerodynamic surface continuity. In the last mentioned case, the fairing extends from the rearward edge of the rearward panel to be carried in a roller track arrangement 28 provided in the flap so that on deflection of the flap the fairing still blends smoothly with the flap and the wing as shown in FIG. 7(b). Referring to FIGS. 4 and 7(g), it will be noted that the surface region 23 of the fuselage side portion over which the inner edge region of the forward and rearward panels sweeps is formed to have a concave profile so as to prevent a gap being formed between the panel and the fuselage side on movement between the fuel storing condition and the empty condition.

Fuel is contained in a fuel cell made of a fuel resistant membrane which fills the triangular volume formed by the fuselage side, the upper wing surface and the lower surface of the forward and rearward panels and may conveniently be of the type described in our earlier U.K. Pat. No. 1,503,510.

Referring now to FIGS. 8 and 9, the operation of the tank is provided by a system of cables 29, each of which attaches at one end to the profile control beam 19 and at the other end to a windlass 30 having a plurality of drive pulleys 30' of different diameter sized to provide the appropriate relative motion between individual cables to ensure the desired profile during inflating movement to the fuel storing expanded condition. The windlass 30 is driven by means of a drive cable 31 wrapped around a main drive pulley 30" of the windlass and retracted and paid out against the flexible bias of the control beam 19 by means of a hydraulic jack 32 which may be disposed either within the wing envelope, or within the fuselage as illustrated in FIGS. 8 and 9.

The tank includes a single inlet/outlet point (not shown) having a valve which can be controlled to open during refuelling and to close when the tank is empty. The action of fuel input to the bag tank forces the panels to hinge to their open fuel storing condition, the control beam 19 assuming its radius of curvature which is restrained and maintained by the windlass cables. As the tank expands, the operating jack freewheels, and cable stops integral with the pulley mounting brackets ensure correct curvature of the control beam. When the tank contains fuel, compression loads are reacted by the fuel whilst suction loads are reacted by the control cables.

Each cable 29 passes from the windlass round a respective idler pulley 33 which is spaced rearwardly from the windlass, and which is supported by a bracket mounted in the wing.

What is claimed is:

1. An aircraft including a fuselage portion, a wing portion connected thereto and expandable fuel storage means entirely disposed at a wing root location adjacent the intersection of said wing portion and said fuselage portion, said fuel storage means having external surface-defining means which includes spanwise spaced inner and outer edge regions extending in a generally clockwise direction, said inner edge region extending alongside and moveably mounted to pass over said fuselage portion and said outer edge region being hingedly attached to said wing portion to allow movement of the surface-defining means between an empty position in which the surface-defining means forms a contiguous and coplanar surface with the surrounding surface of the wing portion and a fuel storing position in which it lies at an acute angle to said surrounding surface and forms a fillet region between the wing portion and the fuselage portion and such that the wetted area of said aircraft is greater with the surface-defining means in said empty position than with the surface-defining means in said fuel storing position.

2. An aircraft as claimed in claim 1 and wherein the external surface-defining means is of trapezoidal planform having an inner edge region lying generally alongside the body portion, an outer edge region extending generally chordwise, a forward edge region extending along a leading edge region of the wing portion and a rearward edge region extending along a trailing edge region of the wing portion.

3. An aircraft as claimed in claim 1 and wherein said fuselage portion over which the inner edge region of the external surface-defining means passes when moving between the empty and the fuel storing position is of concave form.

4. An aircraft as claimed in claim 1 and wherein the fuel storage means includes retraction means operable to draw the external surface-defining means from the fuel storing position towards the empty position.

5. An aircraft as claimed in claim 4 and wherein the retraction means comprises a plurality of tie members attached to the external surface-defining means at spaced locations along its inner edge region.

6. An aircraft as claimed in claim 5 and wherein each of said tie members is caused to retract at a predetermined rate relative to the remainder of said tie members thereby to ensure that said inner edge region adopts a predetermined profile when moving between the fuel storage position and the empty position.

7. An aircraft as claimed in claim 6 and further including a windlass device comprising winding portions for each tie member of predetermined diameter selected having regard to the desired relative rate of retraction.

8. An aircraft as claimed in claim 7 and wherein the windlass is driven by means of a flexible drive element wrapped around a driving portion of the windlass and having a free end attached to a hydraulic ram for effecting longitudinal movement.

9. An aircraft including a fuselage portion, a wing portion connected thereto and expandable fuel storage means disposed adjacent the intersection of said wing portion and said fuselage portion, said fuel storage means having external surface-defining means of trapezoidal planform having an inner region lying generally alongside the fuselage portion, and outer edge region extending generally chordwise, a forward edge region extending along a leading edge region of the wing portion and a rearward edge region extending along a trailing edge region of the wing portion, the trapezoidal surface-defining means comprising a forward resiliently deformable panel element of generally triangular planform and a rearward resiliently deformable panel element of generally rectangular planform, the forward panel element having an inner edge region attached to said leading edge region for hinging movement, and a rearward edge region slidably coupled to a forward edge region of the rearward panel element, said outer edge region being attached to said wing portion to allow movement of the surface-defining means between an empty position in which it lies generally flush with the surrounding surface of the wing portion and a fuel storing position in which it lies at an acute angle to said surrounding surface, forming a fillet region between the wing portion and the fuselage portion.

10. An aircraft as claimed in claim 9 and wherein there is further provided a resiliently flexible beam element of variable effective length attached to and extending along the inner edge regions of said forward and rearward panel elements and being anchored to the wing portion at forward and rearward anchorage points.

* * * * *